US012179324B2

(12) United States Patent
Marburger et al.

(10) Patent No.: US 12,179,324 B2
(45) Date of Patent: Dec. 31, 2024

(54) MODULAR CLAMP

(71) Applicant: FIREBALL TOOL WORKS LLC, Spokane, WA (US)

(72) Inventors: Jason A. Marburger, Spokane, WA (US); Elliott Ian Wong, Alhambra, CA (US); Shao Sheng Chen, Los Angeles, CA (US)

(73) Assignee: FIREBALL TOOL WORKS LLC, Spokane, WA (US)

( * ) Notice: Subject to any disclaimer, the term of this patent is extended or adjusted under 35 U.S.C. 154(b) by 0 days.

(21) Appl. No.: 17/845,693

(22) Filed: Jun. 21, 2022

(65) Prior Publication Data

US 2023/0405768 A1 Dec. 21, 2023

(51) Int. Cl.
*B25B 5/10* (2006.01)
*B25B 5/00* (2006.01)
*B25B 5/16* (2006.01)

(52) U.S. Cl.
CPC .............. *B25B 5/102* (2013.01); *B25B 5/006* (2013.01); *B25B 5/163* (2013.01); *B25B 5/166* (2013.01)

(58) Field of Classification Search
None
See application file for complete search history.

(56) References Cited

U.S. PATENT DOCUMENTS

| | | | | |
|---|---|---|---|---|
| 2,106,525 A * | 1/1938 | Henry | B25H 1/005 | 269/70 |
| 4,949,945 A * | 8/1990 | Whiteley | B25B 1/2484 | 269/95 |
| 6,126,158 A | 10/2000 | Engibarov | | |
| 6,889,968 B1 | 5/2005 | Wong | | |
| 8,246,025 B2 * | 8/2012 | Yamamura | B25B 1/125 | 269/45 |
| 9,387,572 B2 * | 7/2016 | Menze | B25B 5/127 | |
| 10,507,571 B2 * | 12/2019 | Wang | B25H 1/08 | |
| 2005/0082729 A1 * | 4/2005 | Wong | B23Q 3/069 | 269/91 |
| 2009/0039582 A1 * | 2/2009 | McKeirnan | B25B 5/102 | 269/216 |

(Continued)

FOREIGN PATENT DOCUMENTS

| | | | |
|---|---|---|---|
| EP | 2345507 A2 | 7/2011 | |
| FR | 2756766 A1 * | 6/1998 | B25B 5/102 |

(Continued)

OTHER PUBLICATIONS

JP-2008246629-A_Translation (Year: 2008).*

(Continued)

*Primary Examiner* — David S Posigian
*Assistant Examiner* — Jacob Adam Montgomery
(74) *Attorney, Agent, or Firm* — FIG. 1 Patents

(57) ABSTRACT

A modular clamp is described. An example modular clamp includes a clamp assembly and a removable base member. The modular clamp includes multiple rotational aspects located an offset distance from one another and is thus usable to secure workpieces in a variety of positions and orientations while providing access for working thereon. The modular clamp further can be used in a variety of configurations and implementations to achieve a range of different working applications, which is not possible using conventional table clamps.

13 Claims, 14 Drawing Sheets

(56) References Cited

U.S. PATENT DOCUMENTS

| | | | |
|---|---|---|---|
| 2017/0291235 | A1 | 10/2017 | Drake, Jr. |
| 2022/0040822 | A1 | 2/2022 | Marburger |

FOREIGN PATENT DOCUMENTS

| | | | | | |
|---|---|---|---|---|---|
| GB | 2214109 | A | * | 8/1989 | ......... B23K 37/0435 |
| JP | 2008246629 | A | * | 10/2008 | |
| WO | 2022069071 | A1 | | 4/2022 | |
| WO | 2023249617 | A1 | | 12/2023 | |

OTHER PUBLICATIONS

FR-2756766-A1_translation (Year: 1998).*

PCT/US22/34358 , “International Search Report and Written Opinion”, PCT Application No. PCT/US22/34358, Oct. 6, 2022, 12 pages.

* cited by examiner

MODULAR CLAMP

BACKGROUND

Welders, carpenters, and personnel in general often have a need to secure workpieces at various positions to apply work to the workpieces, such as for designing, joining, finishing, etc. A welder, for instance, frequently needs to weld metal workpieces together at specific positions and angles. To assist personnel in arranging and holding workpieces in position, gridded tables have been developed that include grids of holes that are arranged to receive and hold various tools, such as pins, clamps, stop blocks, etc. Table clamps, for instance, can be arranged on a grid table via pins or studs that attempt to position the table clamp adjacent to a particular workpiece to secure the workpiece. Conventional table clamps, however, are often limited to a single rotational component, and thus have a limited range of motion. Accordingly, it is often difficult and time consuming for users to controllably affix workpieces in a desired orientation or position. Further, conventional table clamps are restricted to a single implementation, and therefore experience limited utility.

SUMMARY

A modular clamp is described that can be used in conjunction with or independently of a work surface such as a welding table. An example modular clamp includes a clamp assembly and a removable base member. The modular clamp includes multiple rotational components located an offset distance from one another and is thus usable to secure workpieces in a variety of positions and orientations while providing access for working thereon. The modular clamp further can be used in a variety of configurations and implementations to achieve a range of different working applications.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
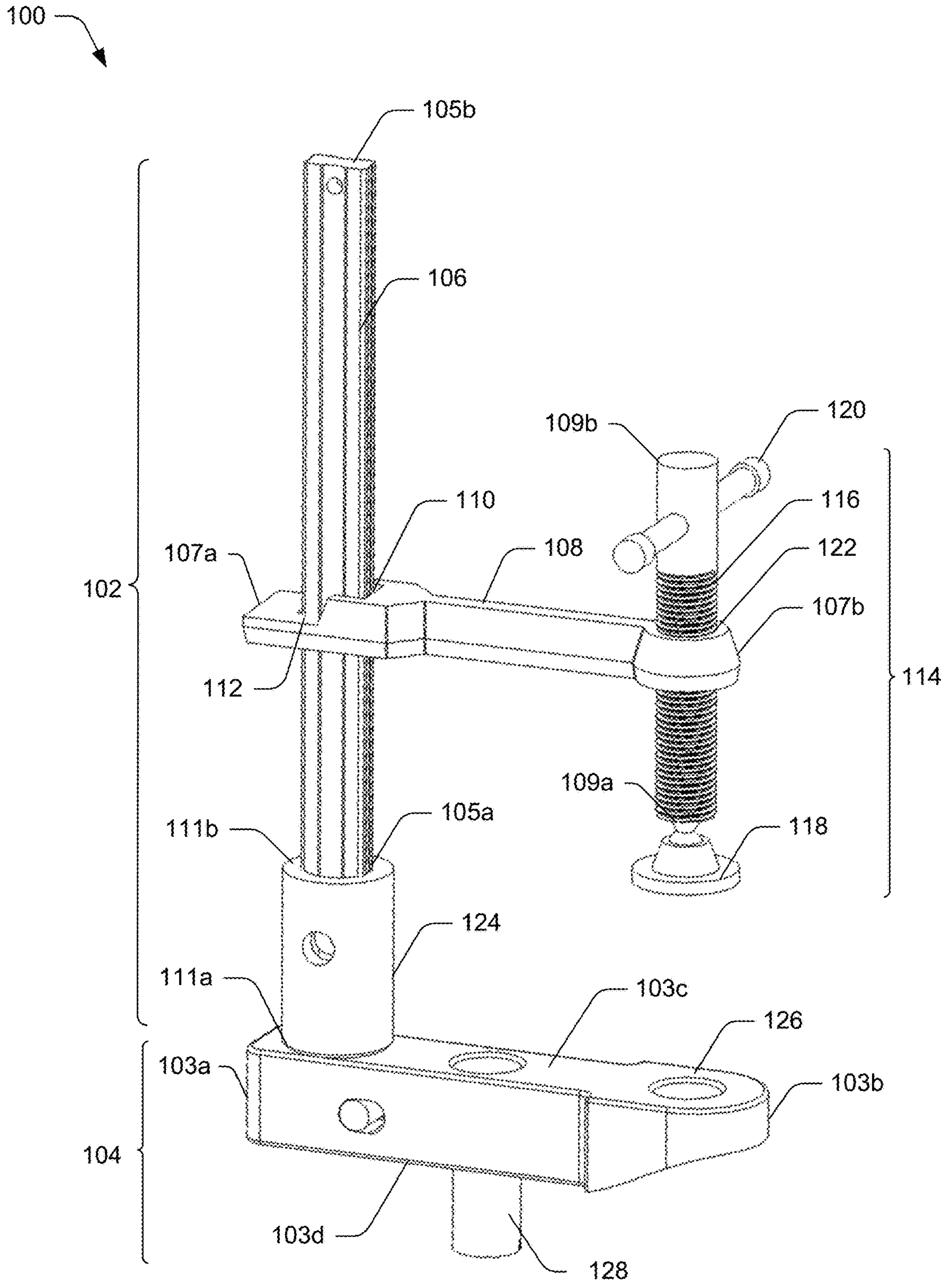
FIG. 1 depicts an example of a modular clamp in accordance with one or more implementations.

Conventional table clamps are used to affix workpieces, for instance between a jaw and a welding table. However, conventional table clamps are either fully rigid or are limited to a single rotational component and thus have a range of motion that is restricted to a fixed circumference around the clamp. Accordingly, it can be difficult and time-consuming for users to secure workpieces in a desired orientation or position. Further, conventional table clamps are not operable independent of a welding table, and therefore experience constrained utility.

Accordingly, a modular clamp is described. In an example, the modular clamp includes a clamp assembly and a removable base member. A variety of clamp assemblies are contemplated, and in one example the clamp assembly includes a guide bar with a proximal end and a distal end, a slidable arm adjustably connected as perpendicular to the guide bar at a proximal end of the slidable arm, and a clamp component including a first jaw attached to a distal end of the slidable arm. The clamp assembly further includes a base adapter attached to the proximal end of the guide bar. The base adapter includes a first mounting interface, for instance to attach to a second mounting interface of the removable base member. Generally, the first and second mounting interfaces enable the clamp assembly to attach to the removable base member while enabling rotation of the clamp assembly about a vertical axis defined by the guide bar. Further, in this way the removable base member is easily removable from the clamp assembly, e.g., by a user who wishes to use the clamp assembly and removable base member separately.

The removable base member also includes a second jaw. In some implementations, the first jaw of the clamp assembly and the second are aligned, such that a workpiece is securable between the first jaw and the second jaw. The modular clamp, for instance, is operable independent of a welding table. Further, the bottom surface of the removable base member includes one or more stud interfaces to attach one or more removable studs. In an example, the removable studs are configured to be inserted into one or more apertures of a welding table or any such suitable surface to attach the modular clamp to the surface.

In some implementations, a stud interface to attach a removable stud is located an offset distance from the mounting interface and the modular clamp is rotatable about a vertical axis defined by the removable stud, for instance when the removable stud is inserted into an aperture of the surface. Thus, the modular clamp includes multiple rotational aspects. In this way, the modular clamp has an increased range of motion and consequently an increased area of coverage, e.g., to clamp a workpiece between the first jaw and the welding table. Accordingly, the described modular clamp provides for a multitude of different configurations and implementations not provided by conventional tools for securing workpieces.

In the following discussion, example modular clamps are described that may employ the techniques described herein. Example scenarios are also described in which the example modular clamps are utilized to secure example workpieces. The example modular clamps are not limited to performance of the example scenarios.

Modular Clamp

FIGS. 1-14 depict various attributes of example modular clamps that are operable to employ techniques described herein. FIG. 1 depicts an example 100 of a modular clamp in accordance with one or more implementations described herein. The modular clamp includes a clamp assembly 102 and a removable base member 104. The clamp assembly 102 includes a guide bar 106 with a proximal end 105*a* and a distal end 105*b*. As illustrated in FIG. 1, the proximal end 105*a* of the guide bar 106 is adjacent to the removable base member 104, while the distal end 105*b* of the guide bar 106 is situated away from the removable base member 104.

The clamp assembly 102 also includes a slidable arm 108 including a proximal end 107*a* and a distal end 107*b*. The proximal end 107*a* of the slidable arm 108 is attached to the guide bar 106 such that the slidable arm 108 is perpendicular to the guide bar 106. The proximal end 107*a* of the slidable arm 108 includes a slidable mounting component 110 to adjustably connect the slidable arm 108 perpendicular to the guide bar 106 such that the slidable arm 108 is movable along a vertical axis of the guide bar 106.

In the illustrated example, the guide bar 106 includes a configuration of grooves extending from the distal end 105*b* of the guide bar 106 to the proximal end 105*a* of the guide bar 106. The slidable mounting component 110 includes a shaped aperture 112 shaped to conform to the configuration of grooves such that the slidable arm 108 is movable along the vertical axis of the guide bar 106 while rotation and movement in one or more other directions is restricted as further described below with respect to FIG. 4. This is by way of example and not limitation, and in various examples the slidable mounting component 110 may leverage other suitable attachment mechanisms to adjustably connect the slidable arm 108 to the guide bar 106.

The distal end 107*b* of the slidable arm 108 is connected to a clamp component 114. In the illustrated example, the clamp component 114 includes a spindle 116, a first jaw 118, and an actuation component 120. This is by way of example and not limitation, and other types of clamp component 114 are considered such as a ratchet clamp, pliers clamp, pneumatic clamp, pipe clamp, parallel clamp, corner clamp, etc. Continuing with the illustrated example, the distal end 107*b* of the slidable arm 108 includes an aperture 122, and the spindle 116 is movably positioned within the aperture 122. In one or more implementations the spindle 116 is a threaded rod, and the aperture 122 is tapped to include threads that correspond to threads of the spindle 116.

The spindle 116 includes a proximal end 109*a* and a distal end 109*b*. The proximal end 109*a* of the spindle 116 is attached to the first jaw 118, e.g., a jaw to contact a surface of a workpiece. In some examples, the first jaw 118 is fixed jaw. As illustrated, the first jaw 118 is a movable jaw connected to the spindle 116 via a movable ball joint. The first jaw 118 is located in a first transverse plane, e.g., a plane perpendicular to the guide bar 106.

The distal end 109*b* of the spindle 116 is attached to the actuation component 120. The actuation component 120 is operable to control the relative location of the first jaw 118, for instance by controlling a position of the spindle 116 relative to the aperture 122 of the slidable arm 108 when actuated. In one or more implementations, the actuation component 120 includes one or more of a ratchet, an ergonomic handle, a lever arm, etc. In the illustrated example, the actuation component 120 includes a sliding pin handle, i.e., a sliding "tommy bar," that is operable to control the position of the spindle 116 relative to the aperture 122 of the slidable arm 108 when actuated. For instance, a user may rotate the sliding pin handle clockwise to position the first jaw 118 closer to the aperture 122 of the slidable arm 108, e.g., to "open" the clamp, or rotate the sliding pin handle counterclockwise to position the first jaw 118 further from the aperture 122 of the slidable arm 108, e.g., to "close" the clamp as further described below with respect to FIG. 5.

The clamp assembly 102 further includes a base adapter 124 to connect the clamp assembly 102 to the removable base member 104. The base adapter 124 has a proximal end 111*a* and a distal end 111*b*, the distal end 111*b* of the base adapter 124 illustrated as adjacent to the guide bar 106 and the proximal end 111*a* of the base adapter 124 illustrated as adjacent to the removable base member 104. The distal end 111*b* of the base adapter 124 is attachable to the proximal end 105*a* of the guide bar 106. In this example, the base adapter 124 and guide bar 106 are attached via an aperture shaped like a cross-section of the guide bar 106. In one or more examples, the guide bar 106 and base adapter 124 are bonded together, e.g., through a mechanical connection or bonding agent. In other examples, the guide bar 106 and base adapter 124 are a single component, e.g., fused together or machined as a single component. This is by way of example and not limitation, and any suitable mechanism of attachment may be used.

Figure 3:
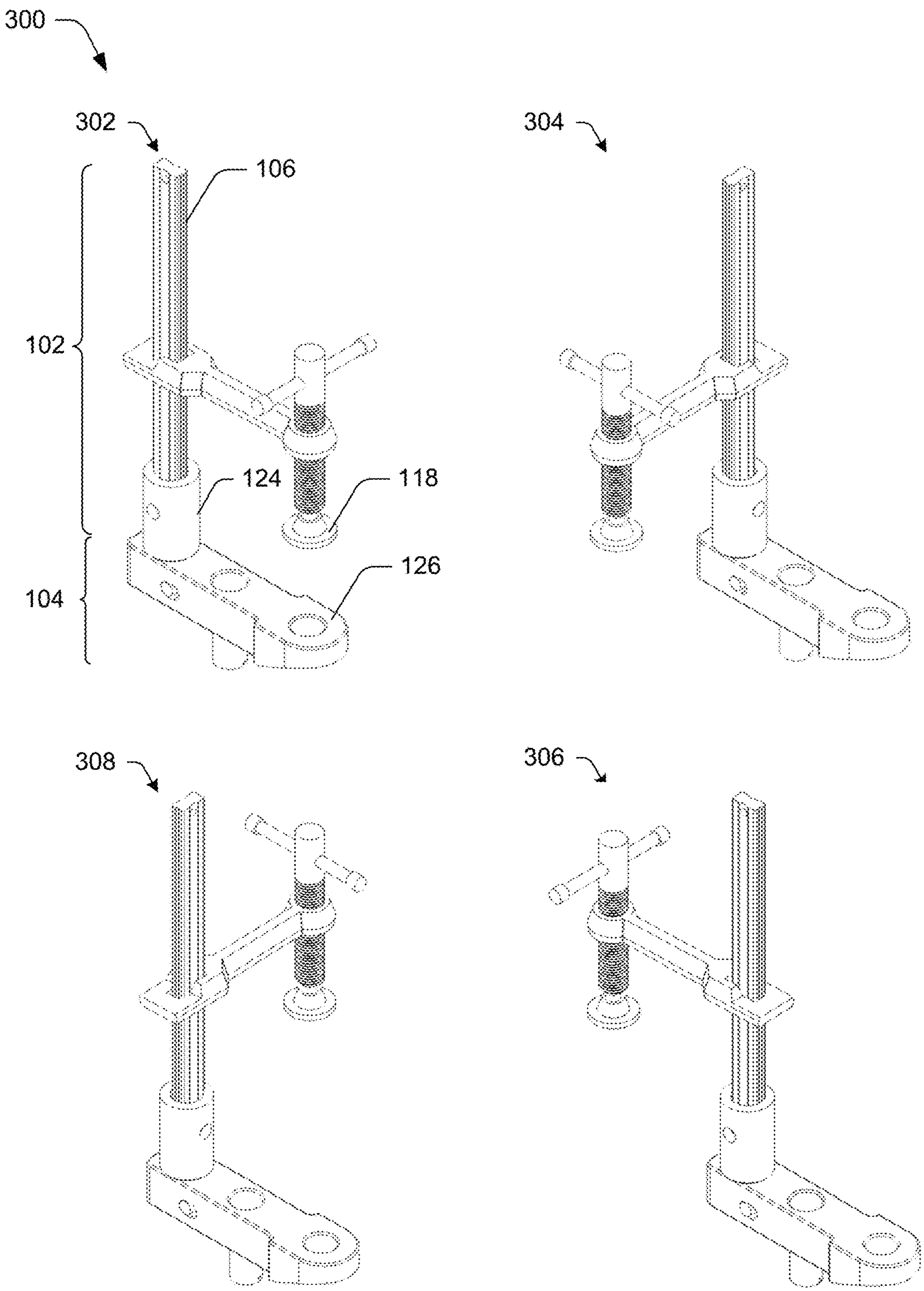
FIG. 3 depicts an example of a modular clamp in which the base adapter is rotatable about a vertical axis in accordance with one or more implementations.

The proximal end 111*a* of the base adapter 124 includes a first mounting interface, for instance to attach to the removable base member 104. Generally, the first mounting interface enables the clamp assembly 102 to connect to the removable base member 104 while enabling rotation of the clamp assembly 102 about a vertical axis, e.g., an axis defined by the center of the mounting interface or the guide bar 106 as illustrated in FIG. 3. In one or more examples, the first mounting interface includes a cylindrical protrusion including a circumferential groove.

The removable base member 104 includes a proximal end 103*a*, a distal end 103*b*, a top surface 103*c*, and a bottom surface 103*d*. As illustrated in FIG. 1, the top surface 103*c* of the removable base member 104 faces the slidable arm 108 and the bottom surface 103*d* is located opposite the top surface 103*c*. The removable base member 104 includes a second mounting interface at the proximal end 103*a* of the top surface 103*c* attachable to the first mounting interface of the base adapter 124. For instance, continuing the example above in which the first mounting interface includes a cylindrical protrusion with a circumferential groove, the second mounting interface includes a mounting aperture configured to house the cylindrical protrusion to attach the clamp assembly 102 to the removable base member 104 at the top surface 103*c*.

The top surface 103*c* at the distal end 103*b* of the removable base member 104 includes a second jaw 126 located in a second transverse plane parallel to the first transverse plane. As illustrated, the first jaw 118 and the second jaw 126 are aligned, e.g., such that a workpiece can be secured between the first jaw 118 and the second jaw 126. In other examples, the clamp assembly 102 is rotatable about the vertical axis defined by the guide bar 106 as described and illustrated in FIG. 3 and accordingly the first jaw 118 and second jaw 126 are not aligned. Thus, a workpiece can be secured between a surface (e.g., a welding table) and the first jaw 118. In some implementations, the second jaw 126 is a fixed jaw, while in other implementations the second jaw 126 includes a movable jaw to better contact a particular workpiece. In some embodiments, the first jaw 118 and second jaw 126 are configured in a particular position, orientation, shape, to optimally secure a workpiece. In an example, the first jaw 118 and/or the second jaw 126 includes a curved surface, e.g., to hold a pipe-shaped workpiece in place.

The bottom surface 103*d* of the removable base member 104 includes a stud interface, such as an aperture to house a removable stud 128. In some examples, the bottom surface 103*d* of the removable base member 104 includes more than one stud interface, e.g., to attach more than one removable stud 128. In some implementations, the removable stud 128 is rotatable about an axis parallel to the vertical axis defined by the guide bar 106. In an example, the removable stud 128 is configured to be inserted into an aperture of a surface such as a welding table. For instance, the removable stud 128 is cylindrical and is a same diameter as cylindrical apertures of the surface. Accordingly, the modular clamp can be integrated with a welding table or other such suitable surface. The modular clamp is thus rotatable about an axis defined by the center of the removable stud 128. In one or more examples, the stud interface is located an offset distance from the second mounting interface.

For instance, as shown in FIG. 1, a removable stud 128 is shown attached to the removable base member 104 as housed by an aperture in the center of the bottom surface 103*d* of the removable base member 104. Accordingly, the modular clamp as illustrated includes a rotational aspect about an axis defined by the guide bar 106, as well as a rotational aspect defined by the removable stud 128. As such, the modular clamp has an increased range of motion and consequently an increased area of coverage, e.g., to clamp a workpiece between a first jaw and the welding table.

Figure 2:
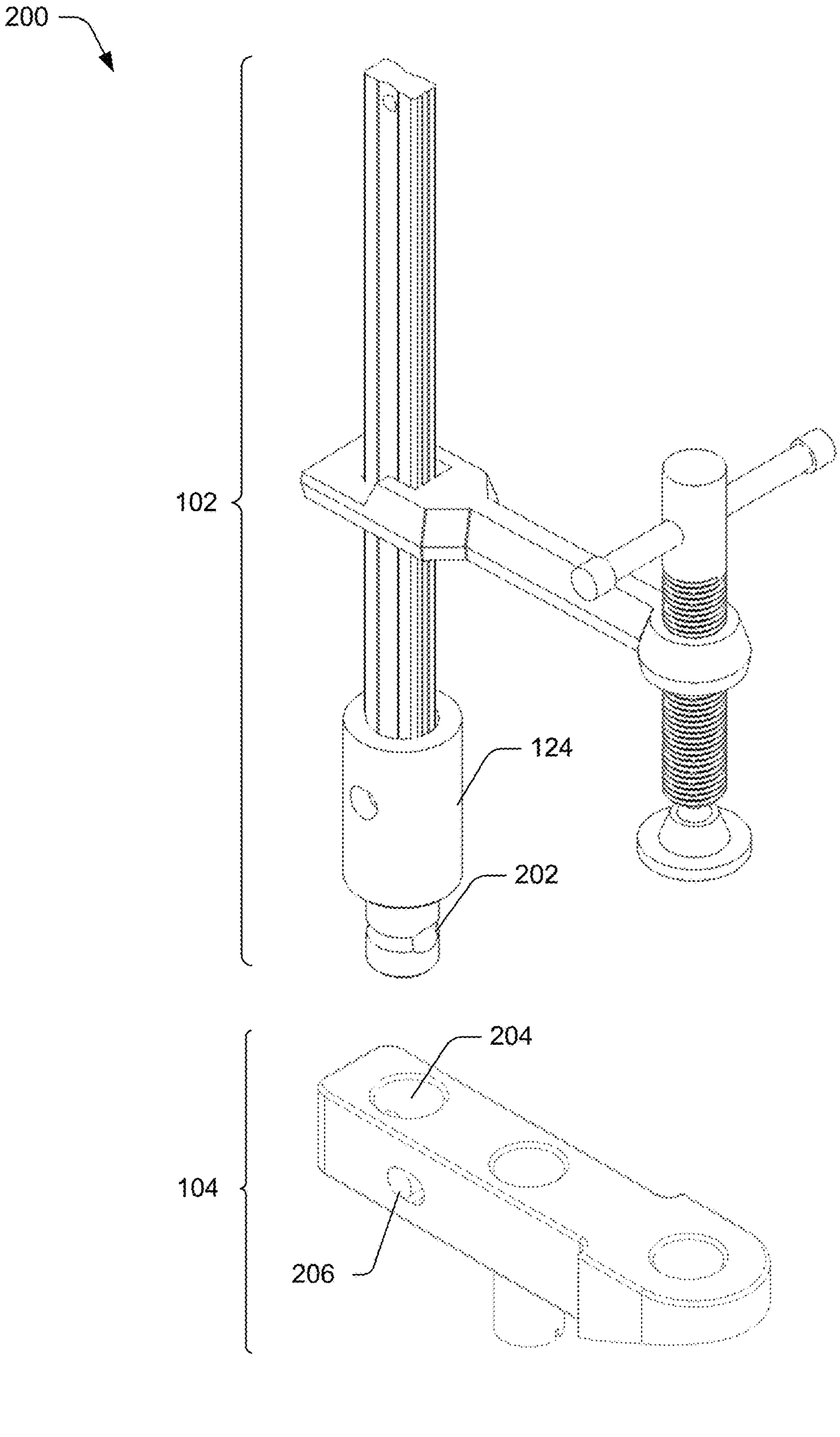
FIG. 2 depicts an example of a modular clamp in which the removable base member is separated from the clamp assembly in accordance with one or more implementations.

FIG. 2 depicts an example 200 of a modular clamp in which the removable base member 104 is separated from the clamp assembly 102. As illustrated, a first mounting interface 202 of the base adapter 124 and a second mounting interface 204 of the removable base member 104 are shown as separated from one another. In this example, the first mounting interface 202 is located at the proximal end 111*a* of the base adapter 124 and includes a cylindrical protrusion including a circumferential groove. The second mounting interface 204, located at the proximal end 103*a* of the top surface 103*c* of the removable base member 104, includes a cylindrical mounting aperture fitted with a locking spring pin 206. Accordingly, the clamp assembly 102 is attachable to the removable base member 104 via the first mounting interface 202 and second mounting interface 204 while enabling a degree of rotational movement. Further, in this way the removable base member 104 is easily removable from the clamp assembly 102, e.g., through actuation of the locking spring pin 206.

A variety of other configurations for the first mounting interface 202 and second mounting interface 204 are contemplated. In one example, the first mounting interface 202 includes a cylindrical protrusion and the second mounting interface 204 includes a cylindrical mounting aperture. Either or both the first mounting interface 202 and/or the second mounting interface 204 is configurable with an O-ring, toric joint, and/or a coil spring, e.g., a canted coil spring, to ensure a strong connection between the first mounting interface 202 and the second mounting interface 204. In some implementations, the first mounting interface 202 and/or the second mounting interface 204 include one or more magnetic inserts. In other implementations, the second mounting interface 204 includes a circumferential groove in a cylindrical mounting aperture to secure the second mounting interface 204 to the first mounting interface 202. In various examples, the circumferential groove is configurable with one or more of an O-ring, toric joint, and/or a coil spring.

In another example, the second mounting interface 204 of the removable base member 104 includes a cylindrical protrusion and the first mounting interface 202 of the base adapter 124 includes a corresponding mounting aperture. In other examples, the first mounting interface 202 includes a threaded cylindrical protrusion and the second mounting interface 204 includes a tapped cylindrical aperture of a same diameter as the threaded cylindrical protrusion to enable the threaded cylindrical protrusion to be screwed into the tapped aperture. The base adapter 124 may include a rotational component, e.g., a radial ball bearing, to enable the clamp assembly 102 to rotate about a vertical axis.

Additionally, in some implementations the first mounting interface 202 further includes one or more perpendicular apertures perpendicular to the cylindrical protrusion. Continuing with this example, the corresponding second mounting interface 204 includes a locking spring pin 206 further configured to extend into the perpendicular apertures. Thus, the locking spring pin 206 is operable to affix the base adapter 124 to the removable base member 104 at one or more rotational orientations. In this way, the clamp assembly 102 can be "locked" at various orientations. In one example, the first mounting interface 202 includes four equally spaced perpendicular apertures. Accordingly, the modular clamp can be "locked" at a variety of orientations such as at 0°, 90°, 180°, and 270°.

FIG. 3 depicts an example 300 of a modular clamp in which the base adapter 124 is rotatable about a vertical axis in first stage 302, second stage 304, third stage 306, and a fourth stage 308. For instance, as illustrated in first stage 302, the modular clamp is shown in a first orientation, e.g., with the first jaw 118 aligned with the second jaw 126. The base adapter 124 of the clamp assembly 102 is rotatable about the vertical axis defined by the guide bar 106 such that the clamp assembly 102 can be rotated, e.g., about an axis perpendicular to the top surface 103*c* of the removable base member 104. Accordingly, progressing to second stage 304, the modular clamp is shown in a second orientation, e.g., with the clamp assembly 102 rotated about a vertical axis 90 degrees counterclockwise. As shown in third stage 306, the modular clamp is in a third orientation with the clamp assembly 102 rotated 180 degrees from the first orientation depicted in the first stage 302. Fourth stage 308 depicts a fourth orientation, e.g., with the clamp assembly 102 rotated 270 degrees counterclockwise from the first orientation. As discussed above, the clamp assembly 102 can be "locked" in place in one or more of these orientations or alternatively is freely rotatable about the vertical axis.

Figure 4:
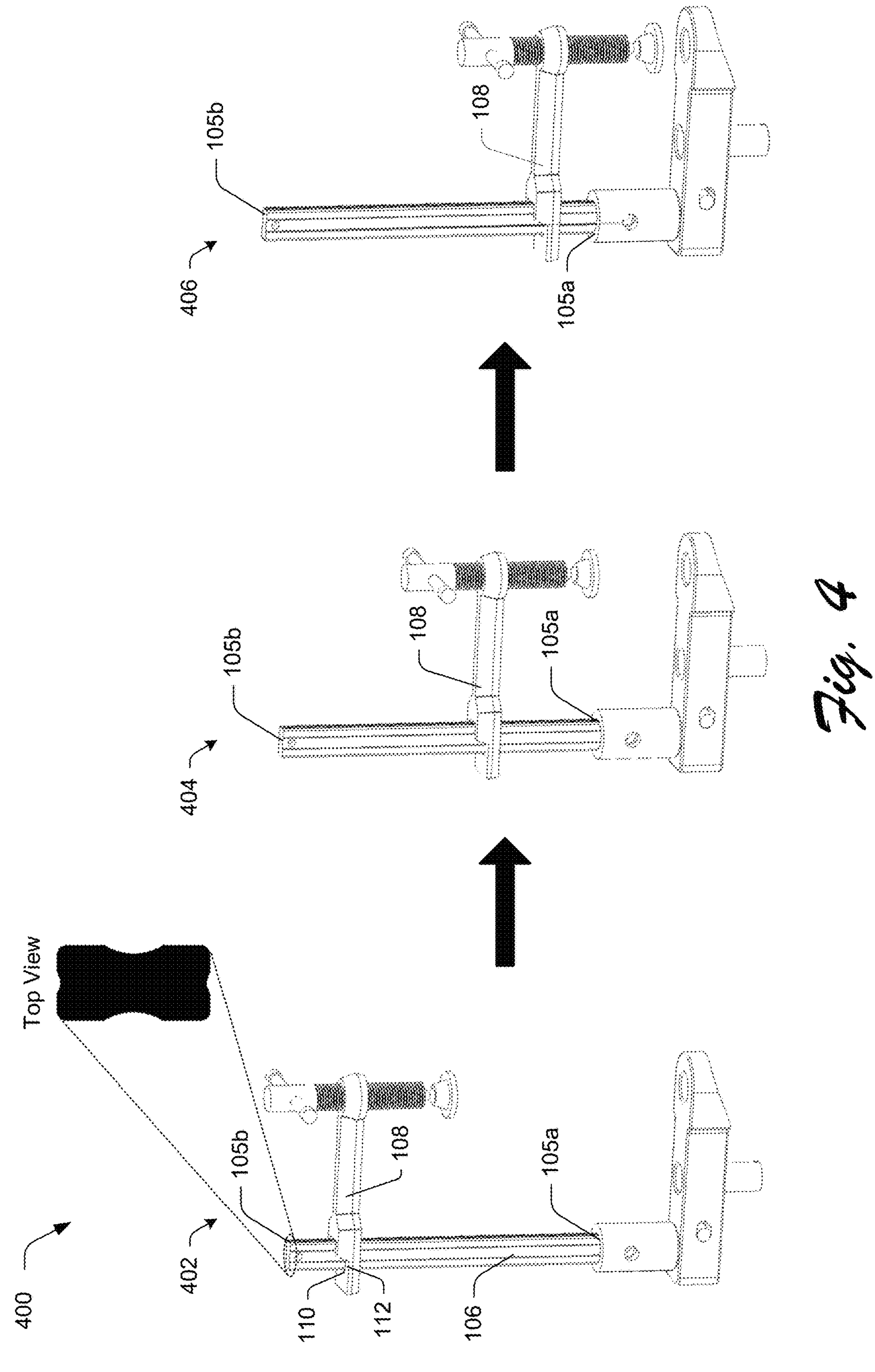
FIG. 4 depicts an example of a modular clamp in which the slidable arm is adjustably connected to the guide bar in accordance with one or more implementations.

FIG. 4 depicts an example 400 of a modular clamp in which the slidable arm 108 is adjustably connected to the guide bar 106 in first stage 402, second stage 404, and a third stage 406. In this example, the guide bar 106 includes a configuration of grooves extending from the distal end 105*b* of the guide bar 106 to the proximal end 105*a* of the guide bar 106 as shown in the top view illustrated at first stage 402. The slidable arm 108 includes a slidable mounting component 110 including a shaped aperture 112 to conform to the configuration of grooves such that the slidable arm 108 is movable along the vertical axis of the guide bar 106 while rotation and/or movement of the slidable arm 108 relative to the guide bar 106 in one or more other directions is restricted.

For instance, at first stage 402 the slidable arm 108 is shown positioned near the distal end 105*b* of the guide bar 106. Progressing to second stage 404, the slidable arm 108 is located approximately halfway between the distal end 105*b* and the proximal end 105*a* of the guide bar 106, e.g., as having been moved down the vertical axis of the guide bar 106. Similarly, as shown in third stage 406, the slidable arm 108 is located close to the proximal end 105*a* of the guide bar 106. In some examples, the slidable mounting component 110 includes a locking mechanism to lock the slidable arm 108 to a location along the guide bar 106.

Figure 5:
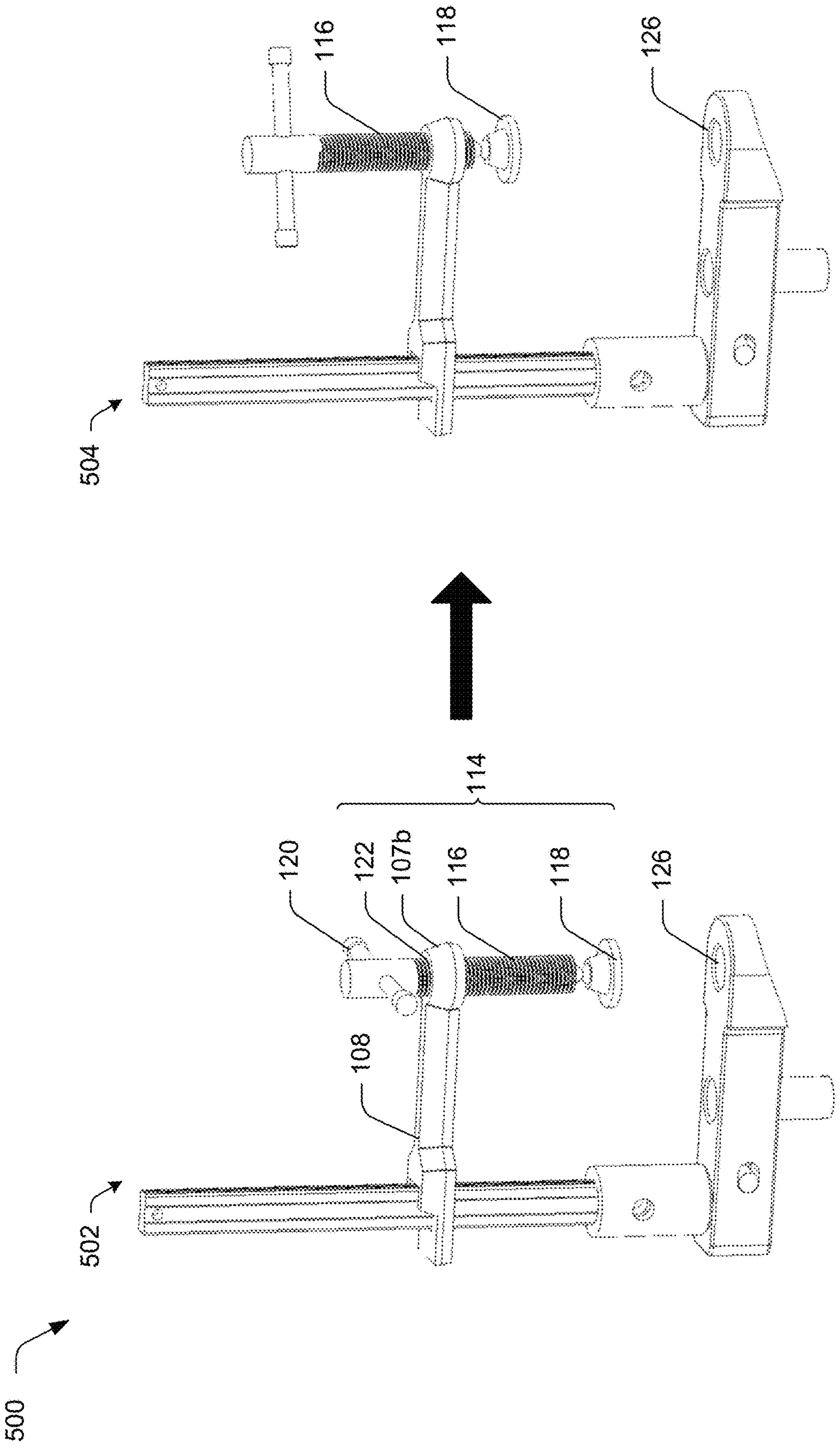
FIG. 5 depicts an example of a modular clamp demonstrating movability of the spindle in first and second stages in accordance with one or more implementations.

FIG. 5 depicts an example 500 of a modular clamp demonstrating movability of the spindle 116 in first stage 502 and a second stage 504. In this example, the clamp component 114 includes the spindle 116 that is movably positioned within an aperture 122 of the distal end 107*b* of the slidable arm 108. As shown in first stage 502, the spindle 116 is in an extended position, e.g., the first jaw 118 is oriented close to the second jaw 126. Progressing to second stage 504, the spindle 116 is in a retracted position, e.g., as moved away from the second jaw 126. In this example, the spindle 116 is movable via actuation of the actuation component 120 which includes a sliding pin handle. For instance, a user may rotate the sliding pin handle clockwise to position the first jaw 118 closer to the aperture 122 of the slidable arm 108, e.g., to "open" the clamp, or rotate the sliding pin handle counterclockwise to position the first jaw 118 further from the aperture 122 of the slidable arm 108, e.g., to "close" the clamp.

Figure 6:
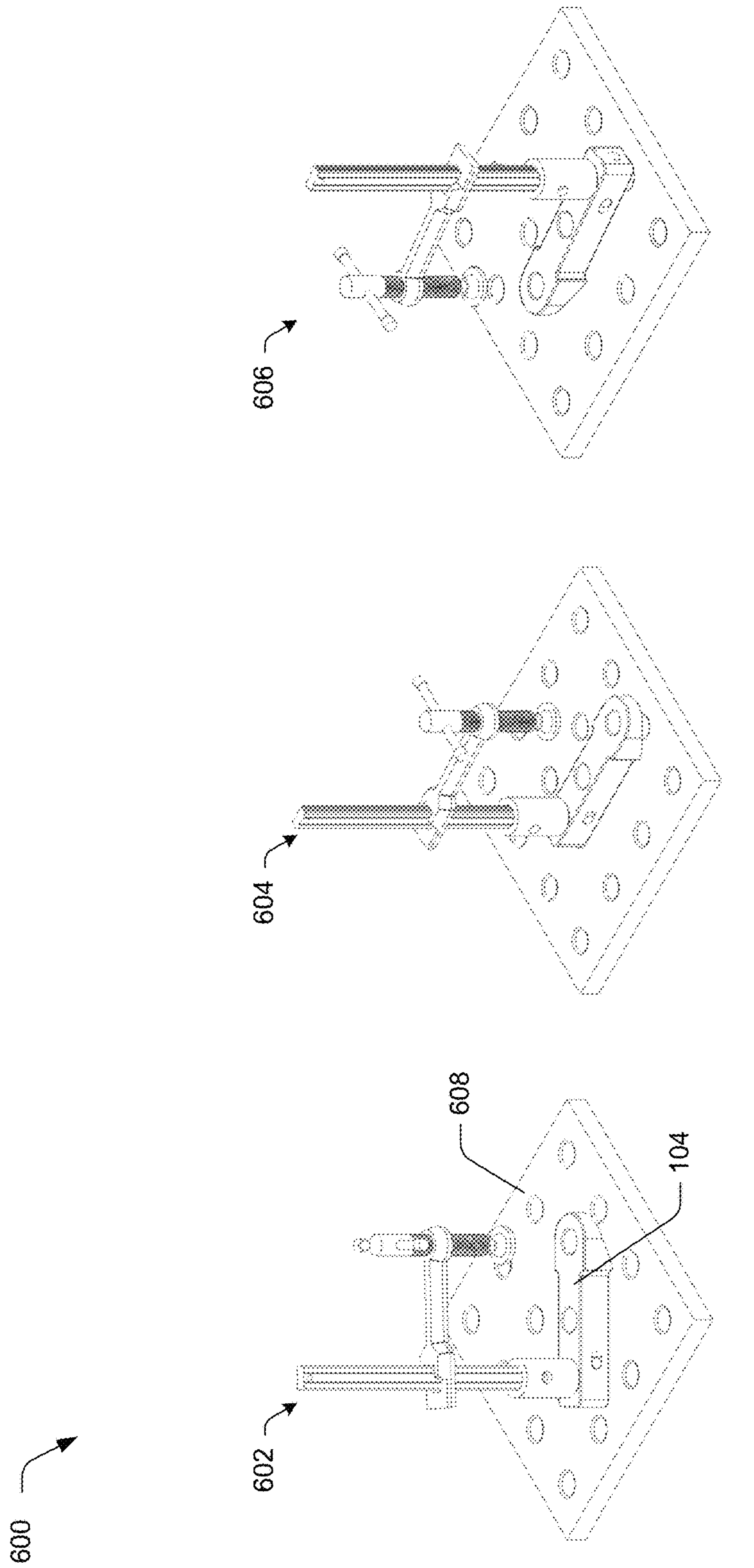
FIG. 6 depicts an example of a modular clamp rotatable about a removable stud on a surface in accordance with one or more implementations.

FIG. 6 depicts an example 600 of a modular clamp rotatable about the removable stud 128 on a surface in first stage 602, second stage 604, and a third stage 606. As illustrated in first stage 602, the removable stud 128 is attached to the removable base member 104 and is inserted into an aperture of a work surface 608, e.g., a welding table. The removable stud 128 is configured to fit into the apertures of the work surface 608, for instance sized to fit a 16 mm diameter aperture of a welding table. In this way, the modular clamp is secured to the table, while enabling rotation about the removable stud 128. For instance, as shown in second stage 604, the modular clamp has been rotated approximately 45° from the initial orientation shown in first stage 602. Third stage 606 illustrates further rotation of the modular clamp about the removable stud 128, e.g., approximately 180° from the orientation depicted in second stage 604.

Figure 7:
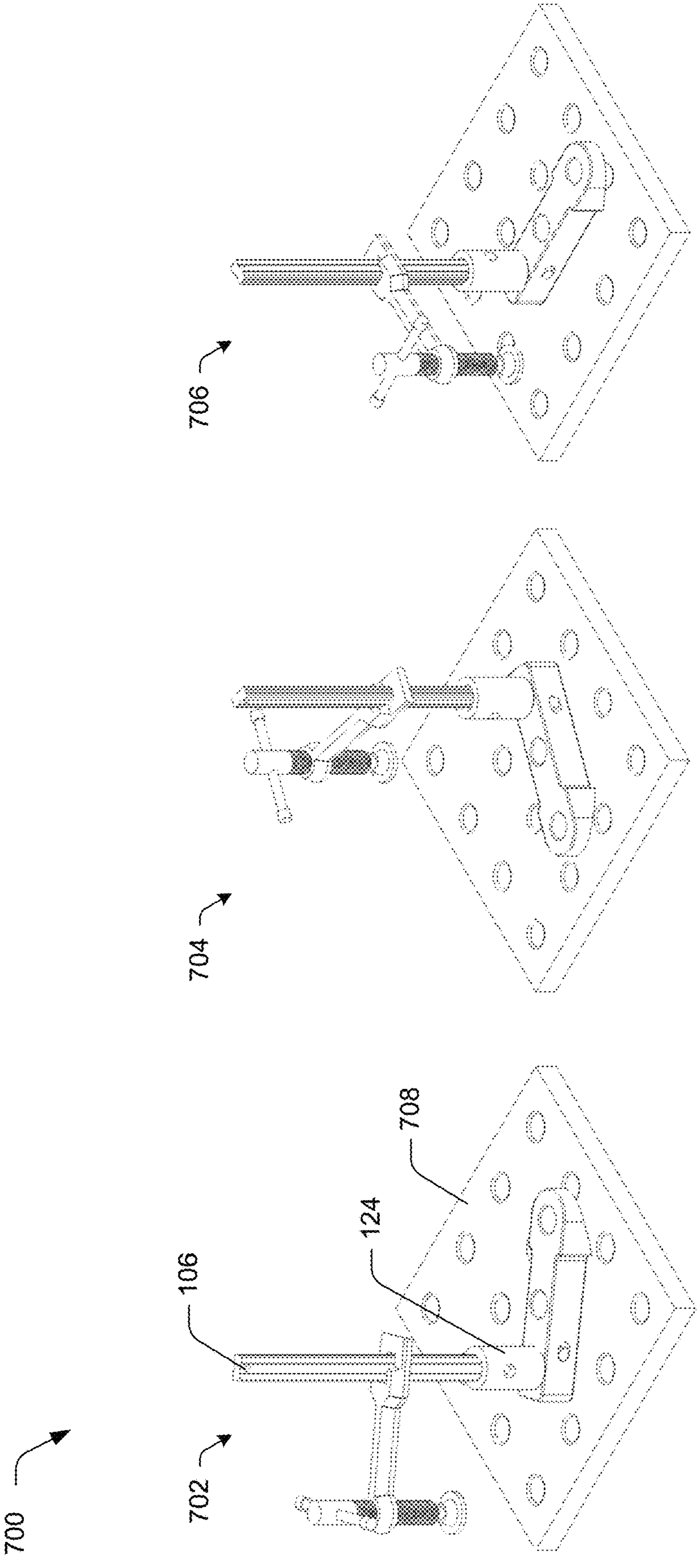
FIG. 7 depicts an example of a modular clamp demonstrating rotation about the base adapter and the removable stud in accordance with one or more implementations.

FIG. 7 depicts an example 700 of a modular clamp demonstrating rotation about the base adapter 124 and the removable stud 128 in first stage 702, second stage 704, and a third stage 706. In this example, the removable stud 128 attached to the removable base member 104 is located an offset distance from the second mounting interface 204 towards the distal end 103*b* of the bottom surface 103*d*. The removable stud 128 is inserted into an aperture of a work surface 708 such as a welding table. Accordingly, the modular clamp as illustrated includes a rotational aspect about an axis defined by the guide bar 106 as well as a rotational aspect defined by the removable stud 128. In this way, the modular clamp is able to achieve a variety of positions and orientations.

For instance, first stage 702 depicts a first orientation of the modular clamp in which the clamp assembly 102 is rotated about the vertical axis defined by the guide bar 106 via rotation of the base adapter 124, as well as rotation of the modular clamp about the removable stud 128. Second stage 704 illustrates a second orientation, further depicting rotation of the clamp assembly 102 about the vertical axis defined by the guide bar 106 as well as rotation of the modular clamp about the removable stud 128 inserted into the work surface 708. Similarly, third stage 706 depicts a third orientation demonstrating rotatability of the modular clamp about the two different vertical axes. Accordingly, the modular clamp as described herein has an increased range of motion and consequently an increased area of coverage. In this way, the modular clamp reduces the incidence of "dead spots" that the modular clamp is unable to reach, and thus overcomes the limitations of conventional table clamps.

Figure 8:
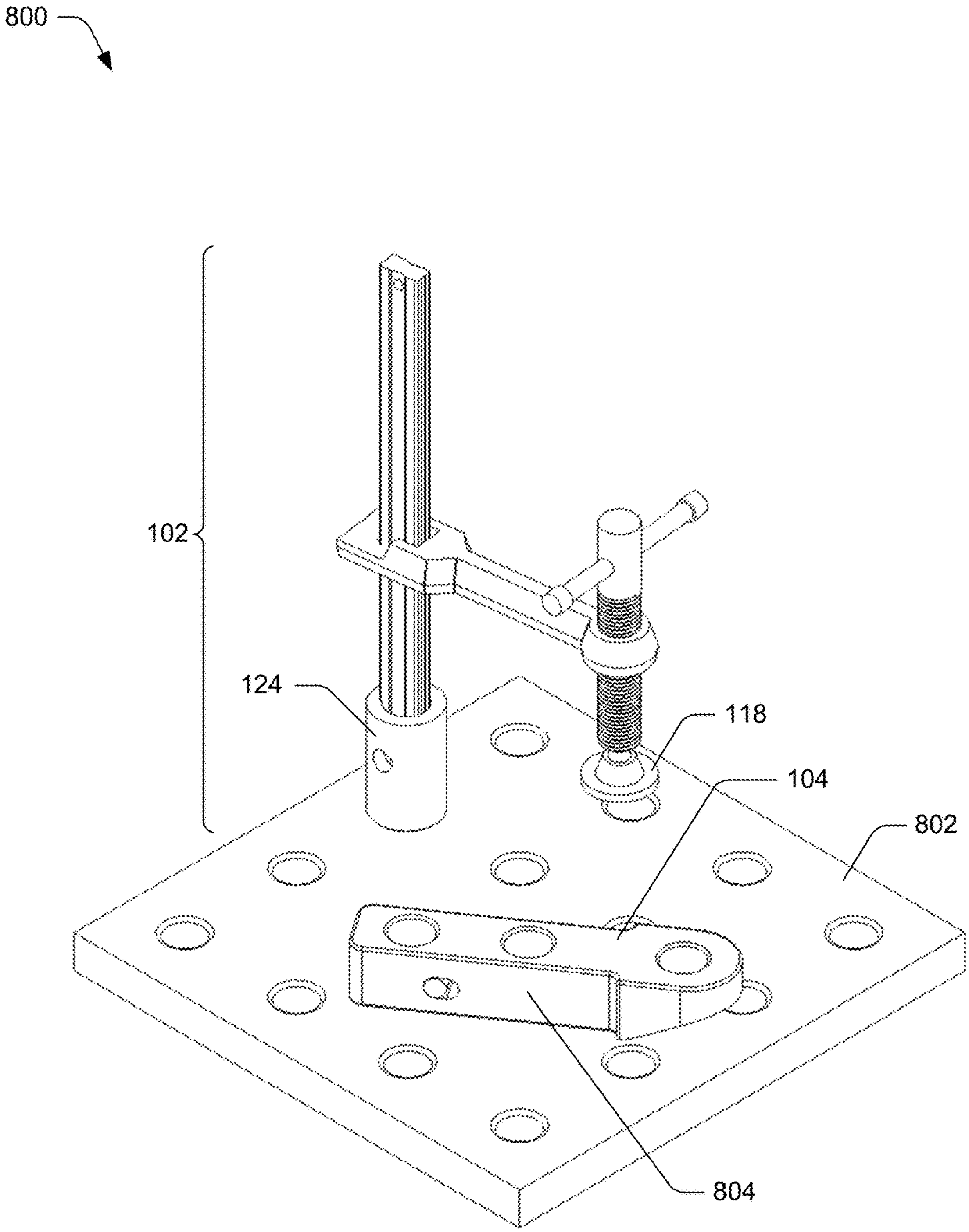
FIG. 8 depicts an example of a modular clamp in which the clamp assembly and removable base member are implemented separately on a surface in accordance with one or more implementations.

FIG. 8 depicts an example 800 of a modular clamp in which the clamp assembly 102 and removable base member 104 are implemented separately on a surface. In the illustrated example, the base adapter 124 of the clamp assembly 102 includes a cylindrical protrusion configured to fit an aperture of a work surface 802, e.g., a 16 mm (or ⅝ inch) diameter aperture of a welding table. Accordingly, the clamp assembly 102 is operable, independent of the removable base member 104, to secure a workpiece between the first jaw 118 and the work surface 802, e.g., of a welding table.

Continuing the example 800, the removable base member 104 includes one or more removable studs 128 (illustrated in other figures but not depicted here) such that the removable base member 104 is attachable to the work surface 802. In this way, the removable base member 104 is operable as a guide, such as to position and orient a workpiece in relation to the work surface 802. In some examples, a side surface 804 of the removable base member 104 between the top surface 103*c* and the bottom surface 103*d* is further configured to align a workpiece to a desired orientation, e.g., by including one or more right angles to "square" a workpiece.

Figure 9:
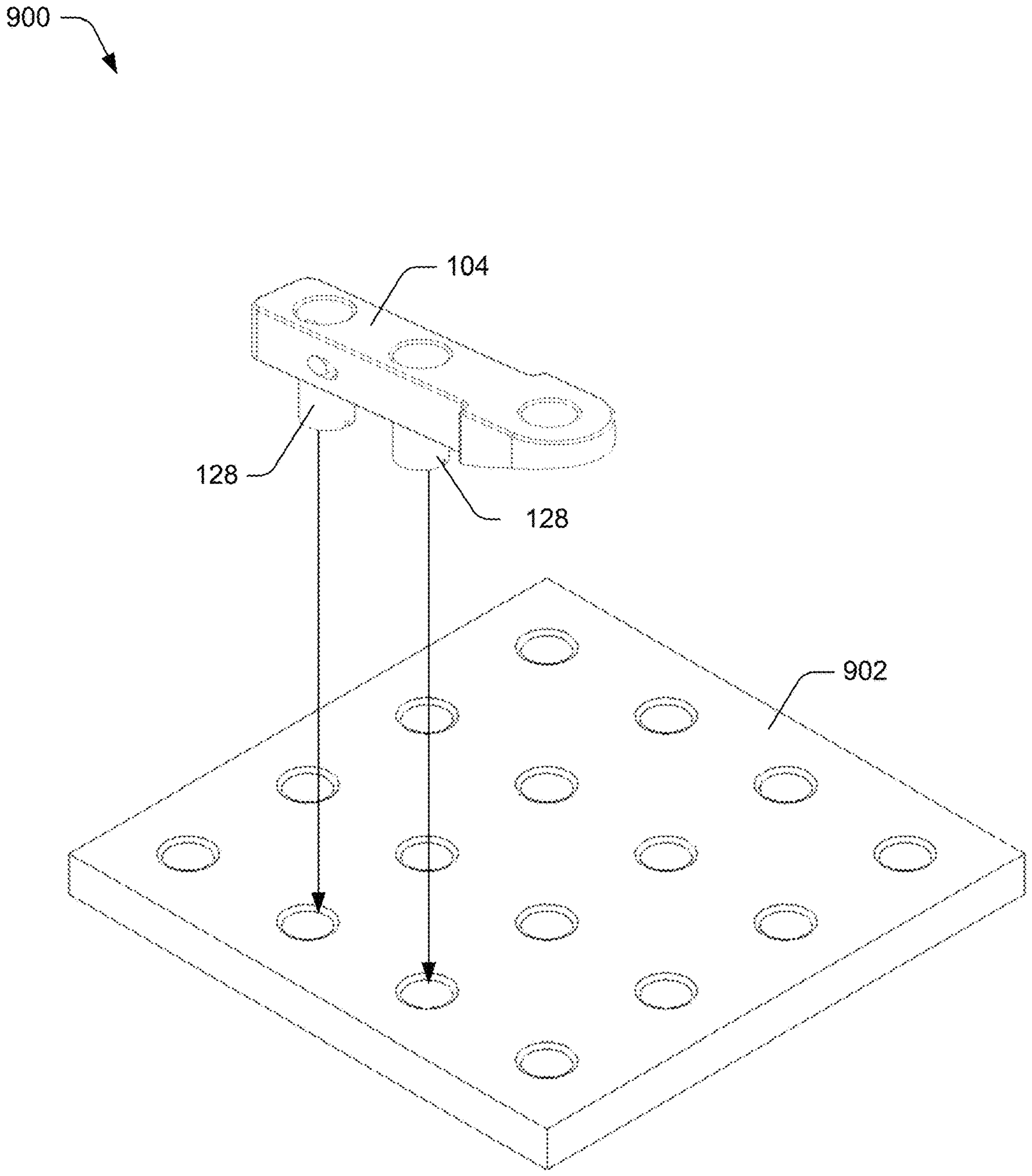
FIG. 9 depicts an example in which the removable base member includes more than one removable stud in accordance with one or more implementations.

FIG. 9 depicts an example 900 in which the removable base member 104 includes more than one removable stud 128. In this example, the bottom surface 103*d* of the removable base member 104 includes at least two stud interfaces attachable to multiple removable studs 128. In one or more implementations, the stud interface includes a threaded aperture, a magnetic attachment, a locking clasp, and/or any other suitable attachment mechanism. In the illustrated example, the stud interfaces of the removable base member 104 are dimensioned to coincide with apertures of a surface 902, e.g., adjacent apertures of a welding table. For instance, in an example in which a welding table includes cylindrical mounting holes spaced two inches from one another, the removable base member 104 includes stud interfaces spaced two inches apart to attach the removable studs 128. In this way, the removable base member 104 is attachable to the surface 902 via the removable studs 128 while preventing lateral or rotational movement to better align and secure a workpiece.

In other examples, the stud interfaces are dimensioned to coincide with diagonal apertures of a surface. For instance, continuing the above example in which the welding table includes cylindrical mounting holes spaced two inches from one another, the bottom surface 103*d* of the removable base member 104 includes at least two stud interfaces spaced 2.83 inches apart, i.e., the distance between diagonal apertures of the welding table. In some implementations, the bottom surface 103*d* of the removable base member 104 includes stud interfaces dimensioned to coincide with both adjacent and diagonal apertures of a surface, e.g., using three stud interfaces. In some examples, one or more of the stud interfaces include a slidable runner such that one or more removable studs 128 can be adjustably spaced at a customizable location. In this way, the removable base member 104 is customizable for a variety of implementations and work surfaces.

Figure 10:
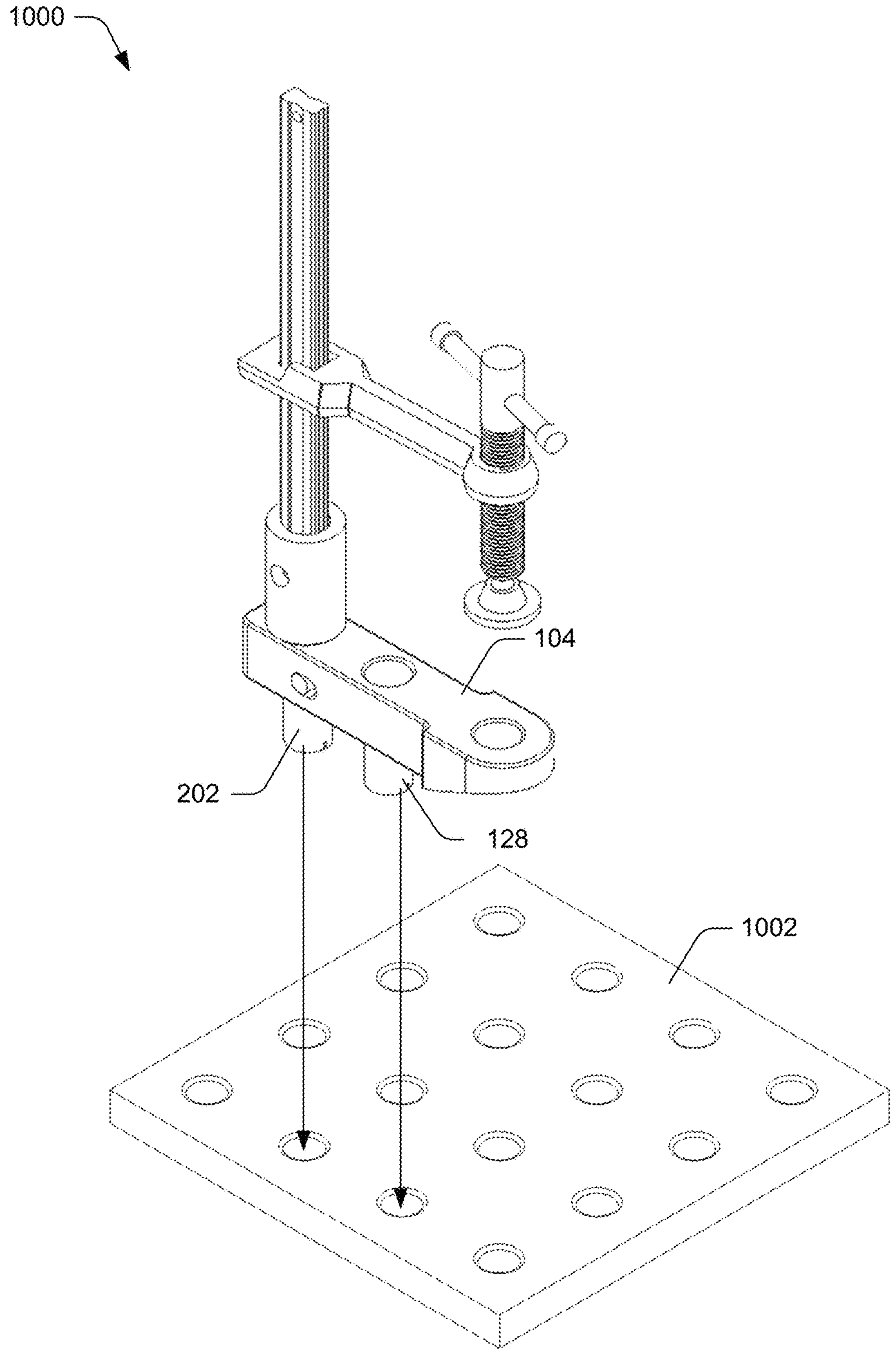
FIG. 10 depicts an example of a modular clamp in which the first mounting interface of the base adapter is extendible through the removable base member in accordance with one or more implementations.

FIG. 10 depicts an example 1000 of a modular clamp in which the first mounting interface 202 of the base adapter 124 is extendible through the removable base member 104. For instance, the first mounting interface 202 includes a cylindrical protrusion dimensioned to fit through the second mounting interface 204 and into an aperture of a work surface 1002. Further in this example, the removable base member 104 includes a stud interface to attach to a removable stud 128. The cylindrical protrusion of the first mounting interface 202 and the removable stud 128 are dimensioned to coincide with apertures in the work surface 1002. Accordingly, the cylindrical protrusion of the first mounting interface 202 can be installed into an aperture of the work surface 1002 concurrently with the removable stud 128 of the removable base member 104. In this way, rotation of the modular clamp about an axis defined by the removable stud 128 is restricted.

Figure 11:
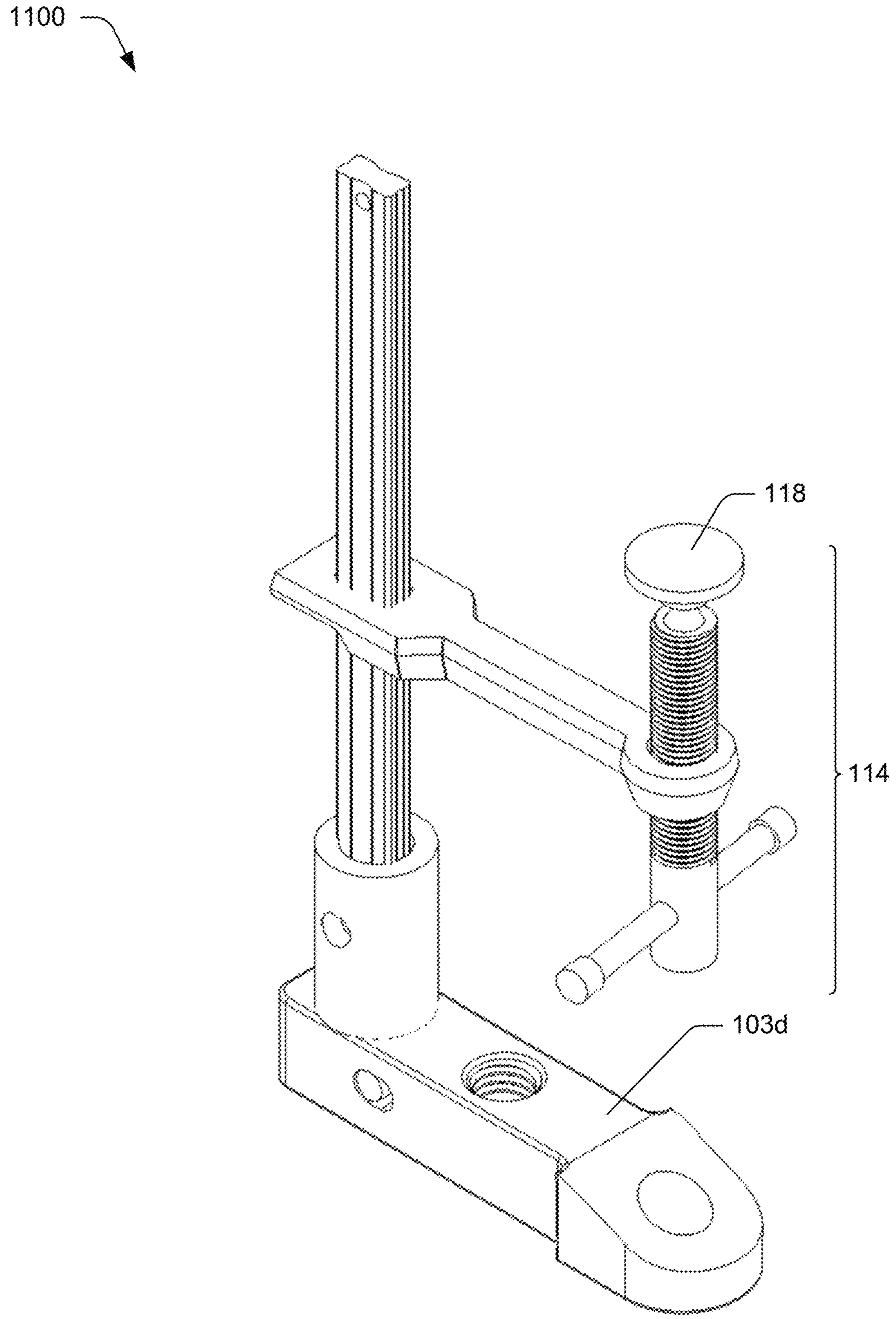
FIG. 11 depicts an example of a modular clamp configured as a spreader clamp in accordance with one or more implementations.

FIG. 11 depicts an example 1100 of a modular clamp configured as a spreader clamp. In some examples, the second mounting interface 204 is attachable to the first mounting interface 202 from either the top surface 103*c* or the bottom surface 103*d* of the removable base member 104. In the illustrated example, the bottom surface 103*d* of the removable base member 104 includes an additional mounting interface, e.g., a third mounting interface located opposite the second mounting interface 204. Accordingly, the first mounting interface 202 is attachable to the third mounting interface such that the top surface 103*c* of the removable base member 104 is oriented away from the clamp assembly 102. As further illustrated, the removable stud 128 is removed from the stud interface of the bottom surface 103*d* in this example. Additionally, the clamp component 114 is invertible such that first jaw 118 faces away from the removable base member 104. In this way, the modular clamp is operable as a spreader clamp to apply outward force on a workpiece.

Figure 12:
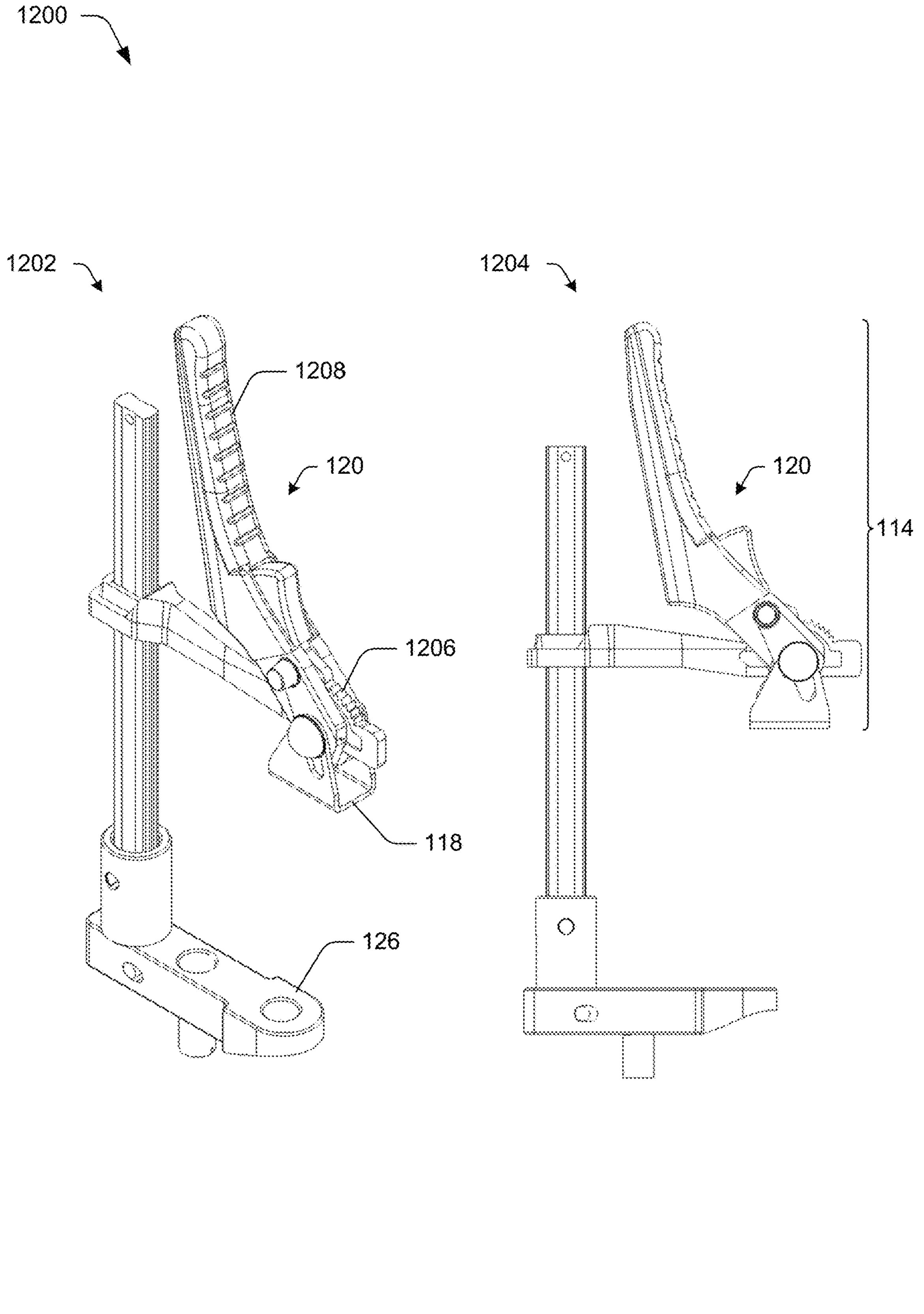
FIG. 12 depicts an example of a modular clamp in which the clamp component includes a ratchet clamp.

FIG. 12 depicts an example 1200 of a modular clamp in which the clamp component 114 includes a ratchet clamp in first orientation 1202 and a second orientation 1204. In the illustrated example, the clamp component 114 includes a ratchet mechanism 1206 and the actuation component 120 includes a ratchet handle 1208. Actuation of the ratchet handle 1208 causes the first jaw 118 to depress, e.g., to “close” the clamp, and the ratchet mechanism 1206 ensures a consistent application of force, e.g., on a workpiece placed between the first jaw 118 and the second jaw 126. Thus, the ratchet mechanism 1206 is operable to prevent the first jaw 118 from “slipping” and losing contact with a workpiece. Accordingly, the ratchet mechanism 1206 enables rapid and precise securing of a workpiece. As noted above, the modular clamp is configurable with a variety of clamp assemblies 102 and clamp components 114, such as a pneumatic clamp, pipe clamp, parallel clamp, corner clamp, pliers clamp, etc. In this way, the modular clamp is configurable for a wide range of usage scenarios and implementations.

Figure 13:
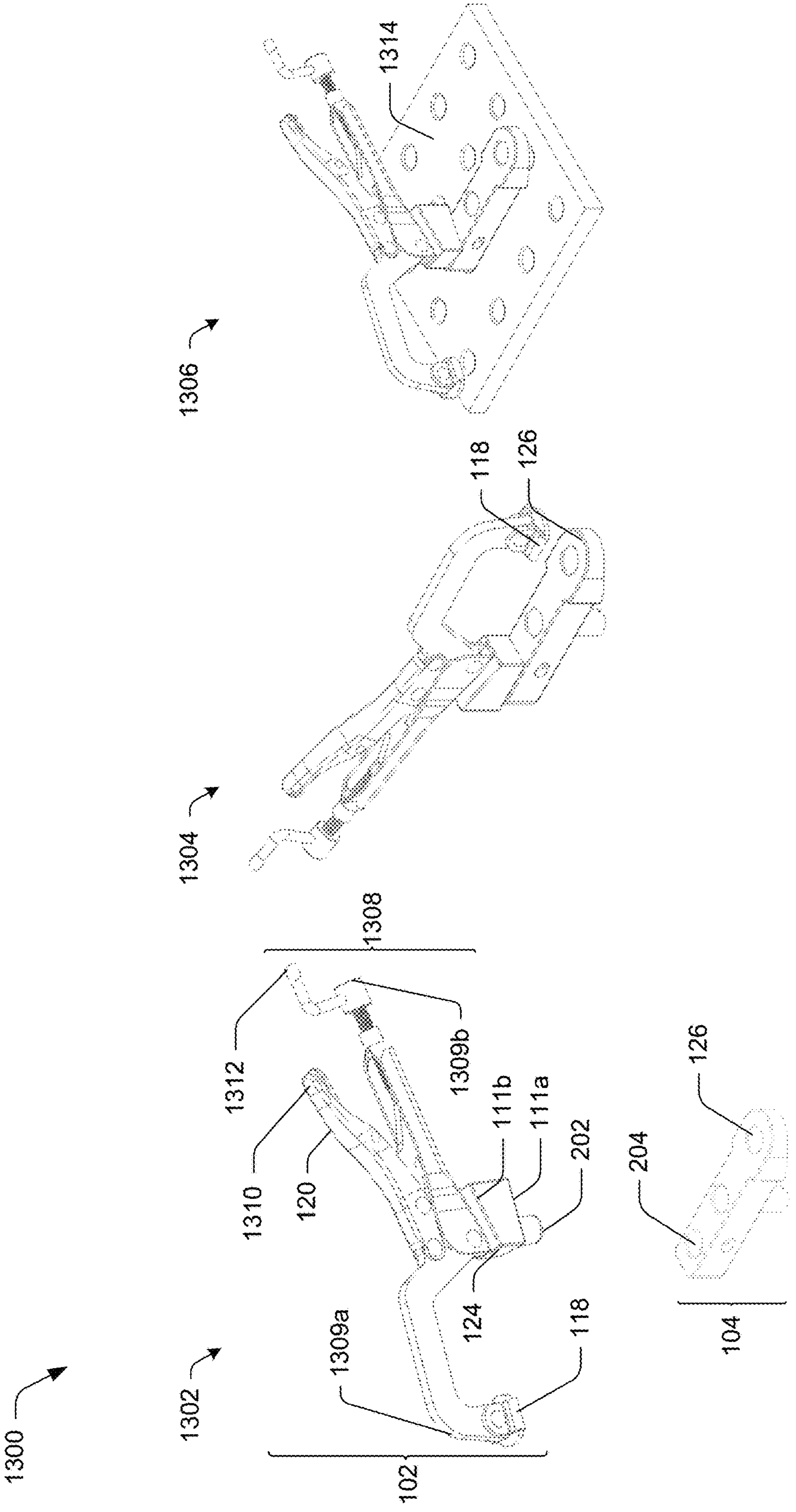
FIG. 13 depicts an example of a modular clamp in which the clamp assembly includes a pliers clamp.

FIG. 13 depicts an example 1300 of a modular clamp in which the clamp assembly 102 includes a pliers clamp in first stage 1302, second stage 1304, and third stage 1306. As illustrated in first stage 1302, the clamp assembly 102 includes a pliers body 1308 including a proximal end 1309*a* and a distal end 1309*b*. The proximal end 1309*a* of the pliers body 1308 includes a first jaw 118, and the distal end 1309*b* of the pliers body 1308 includes an actuation component 120. In this example, the actuation component 120 includes a handle 1310 that is operable to control the position of the first jaw 118 when actuated. For instance, actuation of the handle 1310 causes the first jaw 118 to depress, e.g., to “close” the clamp or to “lock” the clamp. In some examples, the handle 1310 includes a quick-release lever operable to quickly “open” the clamp. In one or more examples, the pliers body 1308 further includes a crank handle 1312, which is operable to make fine adjustments to the position of the first jaw 118. For instance, a user may rotate the crank handle 1312 clockwise to depress the first jaw 118, e.g., to “close” the clamp, or rotate the crank handle 1312 counterclockwise to “open” the clamp, e.g., to position the first jaw 118 further from a work surface or the second jaw 126. In this way, the location or position of the first jaw 118 can be adjusted while the clamp is closed or locked, as well as adjusted while the clamp is open.

The clamp assembly 102 further includes a base adapter 124 to connect the clamp assembly 102 to the removable base member 104, for instance as described above. The base adapter 124 includes a proximal end 111*a* and a distal end 111*b*, the distal end 111*b* of the base adapter 124 illustrated as adjacent to the pliers body 1308 and the proximal end 111*a* of the base adapter 124 illustrated as adjacent to the removable base member 104. The distal end 111*b* of the base adapter 124 is attachable to the pliers body 1308, e.g., via a mechanical interface, bonding agent, or any suitable mechanism of attachment. In an example, the base adapter 124 is extendable such that the position of the first jaw 118 can be further adjusted, e.g., to be positioned at a variety of heights. In another example, the base adapter 124 is configurable with one or more riser blocks, e.g., for customized height adjustment for a variety of workpiece sizes. The proximal end 111*a* of the base adapter 124 includes a first mounting interface 202, for instance to attach to a second mounting interface 204 of the removable base member 104 as further described above.

Second stage 1304 depicts an example in which the clamp assembly 102 is attached to the removable base member 104 and the first jaw 118 and the second jaw 126 are aligned, such that a workpiece is securable between the first jaw 118 and the second jaw 126. In this example, the modular clamp is thus operable independent of a welding table. Third stage 1306 depicts the modular clamp attached to a work surface 1314, for instance a welding table, by a removable stud 128. The modular clamp is rotatable about an axis defined by the first mounting interface 202, e.g., by rotation of the clamp assembly 102 via the base adapter 124, and is also rotatable about an axis defined by the removable stud 128. Thus, a workpiece is securable between the first jaw 118 and the work surface 1314 at a variety of orientations and positions.

Figure 14:
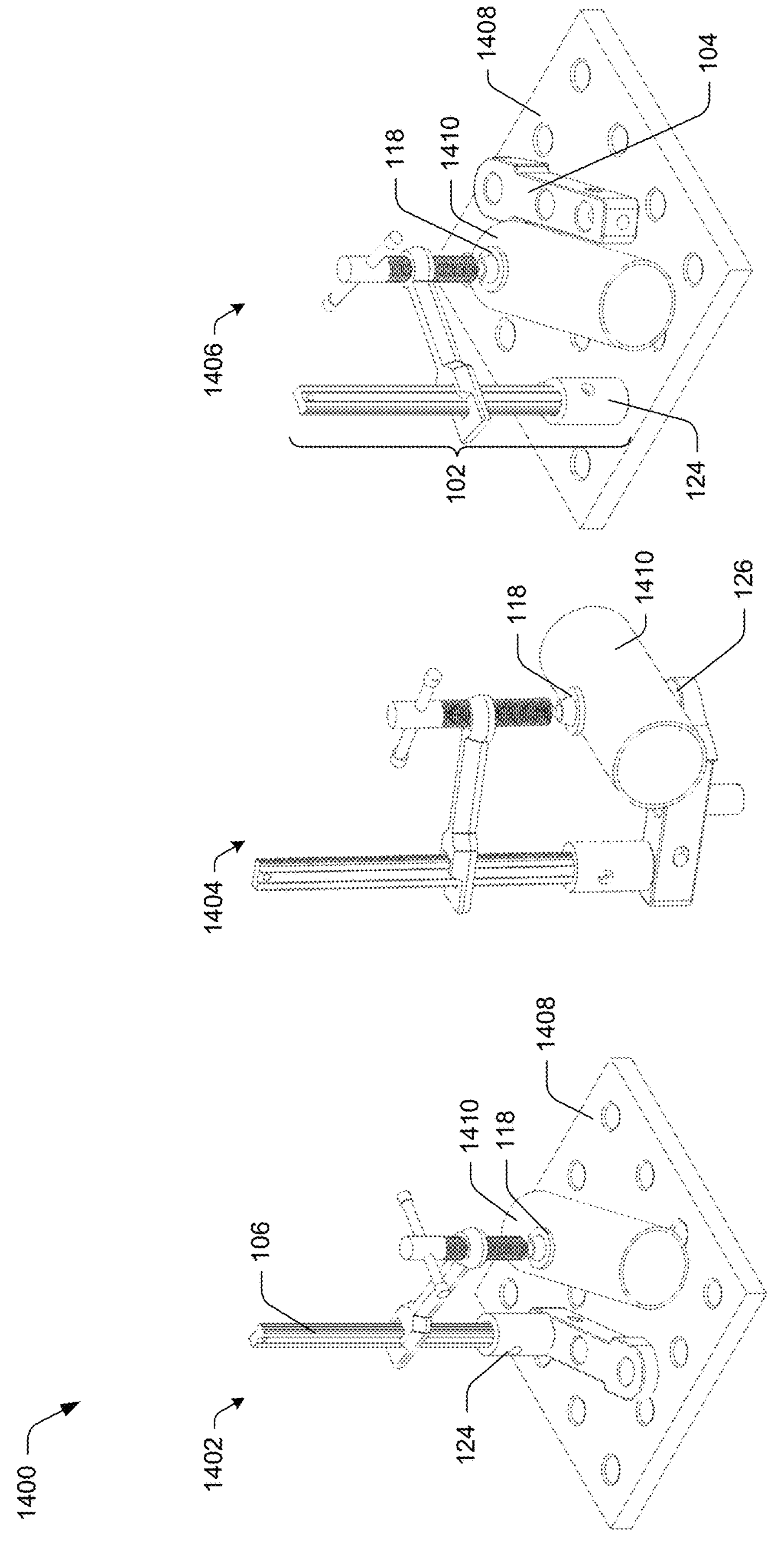
FIG. 14 depicts various example scenarios for utilizing an example modular clamp in accordance with one or more implementations.

FIG. 14 depicts various example scenarios 1400 for using an example modular clamp in first stage 1402, second stage 1404, and a third stage 1406. In first stage 1402, the modular clamp is attached to a work surface 1408, in this example a welding table, by a removable stud 128. The modular clamp is rotatable about an axis defined by the guide bar 106, e.g., by rotation of the clamp assembly 102 via the base adapter 124, and is also rotatable about an axis defined by the removable stud 128. Accordingly, the first jaw 118 is oriented adjacent to a workpiece 1410 such that the workpiece 1410 is secured between the first jaw 118 and the work surface 1408. Second stage 1404 illustrates use of the modular clamp independent of a welding table. In this example, the first jaw 118 and the second jaw 126 are aligned, and the workpiece 1410 is secured between the first jaw 118 and second jaw 126.

Third stage 1406 depicts the clamp assembly 102 and removable base member 104 implemented separately on the work surface 1408 such as a welding table. The base adapter 124 of the clamp assembly 102 includes a cylindrical protrusion configured to fit an aperture of the work surface 1408, e.g., a 16 mm or diameter aperture of the welding table. The removable base member 104 includes one or more removable studs 128 such that the removable base member 104 is attachable to the welding table via insertion of the removable studs 128 into apertures of the welding table. Accordingly, the clamp assembly 102 is operable to secure the workpiece 1410 between the first jaw 118 and the welding table and the removable base member 104 is operable as a guide, such as to further secure the workpiece 1410 in a desired position. In this way, the modular clamp exhibits various functionalities and applications that are not possible using conventional techniques.

CONCLUSION

Accordingly, modular clamp assemblies and implementations are described. The modular clamps are usable in a variety of configurations to secure various workpieces while providing access for performing work techniques thereon, which is not possible using conventional tools and techniques.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention. Additional aspects of the techniques, features, and/or methods discussed herein relate to one or more of the following:

In some aspects, the techniques described herein relate to a modular clamp including: a clamp assembly including: a guide bar with a proximal end and a distal end; a slidable arm including a proximal end and a distal end, the proximal end of the slidable arm including a slidable mounting component to adjustably connect the slidable arm as perpendicular to the guide bar, the distal end of the slidable arm including an aperture; a spindle movably positioned within the aperture and including a proximal end and a distal end, the proximal end of the spindle including a movable jaw located in a first transverse plane and the distal end of the spindle attached to an actuation component; and a base adapter including a proximal end and a distal end, the distal end of the base adapter including an aperture attachable to the proximal end of the guide bar, the proximal end of the base adapter including a first mounting interface; and a removable base member including a top surface, a bottom surface, a proximal end and a distal end, the top surface at the distal end of the removable base member including a fixed jaw located in a second transverse plane parallel to the first transverse plane, the top surface at the proximal end of the removable base member including a second mounting interface attachable to the first mounting interface of the base adapter, the bottom surface including one or more apertures to house one or more removable studs.

In addition to the previously described modular clamp, any one or more of the following: wherein in a first orientation the fixed jaw of the removable base member is aligned with the movable jaw of the clamp assembly; wherein the base adapter is rotatable about a vertical axis defined by the guide bar; wherein the one or more apertures to house the one or more removable studs are located an offset distance from the second mounting interface towards the distal end of the bottom surface; wherein the modular clamp is rotatable about a vertical axis defined by a removable stud of the one or more removable studs; wherein the first mounting interface includes a cylindrical protrusion including one or more perpendicular apertures and the second mounting interface includes a locking spring pin to affix the base adapter to the removable base member at one or more rotational orientations; wherein the first mounting interface includes a threaded cylindrical protrusion, and the second mounting interface includes a tapped cylindrical aperture of a same diameter as the threaded cylindrical protrusion; wherein the actuation component is one or more of a lever arm, ergonomic handle, or sliding pin handle to control a position of the spindle relative to the aperture of the slidable arm when actuated; wherein the guide bar includes a configuration of grooves extending from the distal end of the guide bar to the proximal end of the guide bar, and wherein the slidable mounting component includes an aperture shaped to conform to the configuration of grooves such that the slidable arm is movable along an axis of the guide bar; wherein the slidable mounting component includes a locking mechanism to lock the slidable arm to a location along the guide bar; wherein the second mounting interface includes one or more of an O-ring, coil spring, magnetic insert, or circumferential groove attachable to the first mounting interface; wherein the one or more removable studs are cylindrical and are a same diameter as an aperture included on a surface; wherein the spindle includes a threaded rod and the aperture of the slidable arm is tapped to movably position the threaded rod within the aperture.

A removable base member including: a top surface, a bottom surface, a proximal end, and a distal end; a jaw located on the distal end of the top surface; a mounting aperture located on the proximal end of the top surface configured to attach a clamp assembly to the removable base member at the top surface; and a first stud interface on the bottom surface, the first stud interface located an offset distance from the mounting aperture and configured to attach a first removable stud.

In addition to the previously described removable base member, any one or more of the following: wherein the mounting aperture includes a locking spring pin to attach the clamp assembly to the removable base member and enable rotation of the clamp assembly about an axis perpendicular to the top surface; wherein the mounting aperture is further configured to attach the clamp assembly to the removable base member at the bottom surface; further including a second stud interface on the bottom surface configured to attach a second removable stud, the first stud interface and the second stud interface dimensioned to coincide with apertures of a surface.

A modular clamp including: a clamp assembly including: a pliers body including a proximal end and a distal end, the proximal end of the pliers body including a first jaw, the distal end of the pliers body including an actuation component; a base adapter including a proximal end and a distal end, the distal end of the base adapter attached to the pliers body, the proximal end of the base adapter including a first mounting interface; and a removable base member including a top surface, a bottom surface, a proximal end and a distal end, the top surface at the distal end of the removable base member including a second jaw, the bottom surface including one or more stud interfaces attachable to one or more removable studs, and the top surface at the proximal end of the removable base member including a second mounting interface attachable to the first mounting interface.

In addition to the previously described modular clamp, any one or more of the following: wherein at least one stud interface of the one or more stud interfaces includes a slidable runner to adjustably attach the one or more removable studs; wherein the base adapter is extendable to adjust a position of the first jaw.

What is claimed is:

1. A modular clamp comprising:

a clamp assembly including:

a guide bar with a proximal end and a distal end;

a slidable arm including a proximal end and a distal end, the proximal end of the slidable arm including a slidable mounting component to adjustably connect the slidable arm as perpendicular to the guide bar, the distal end of the slidable arm including an aperture;

a spindle movably positioned within the aperture and including a proximal end and a distal end, the proximal end of the spindle including a movable jaw located in a first transverse plane and the distal end of the spindle attached to an actuation component; and a base adapter including a proximal end and a distal end, the distal end of the base adapter including an aperture attachable to the proximal end of the guide bar, the proximal end of the base adapter including a first mounting interface, the first mounting interface including a cylindrical protrusion with a circumferential groove and two or more perpendicular apertures positioned within the circumferential groove; and a removable base member including a top surface, a bottom surface, a proximal end and a distal end, the top surface at the distal end of the removable base member including a fixed jaw located in a second transverse plane parallel to the first transverse plane, the top surface at the proximal end of the removable base member including a second mounting interface attachable to the first mounting interface of the base adapter via a locking spring pin dimensioned to coincide with the circumferential groove of the first mounting interface such that the clamp assembly is continuously rotatable about a first vertical axis to enable the movable jaw to rotate continuously in the first transverse plane while restricting movement of the clamp assembly along the first vertical axis, the locking spring pin further dimensioned to affix the removable base member to the clamp assembly at one or more rotational orientations via engagement with the two or more perpendicular apertures, the bottom surface including a removable stud located an offset distance from the first vertical axis such that the modular clamp is further continuously rotatable about a second vertical axis defined by the removable stud to enable an extended range of motion of the movable jaw in the first transverse plane.

2. The modular clamp as described in claim 1, wherein in a first orientation the fixed jaw of the removable base member is aligned with the movable jaw of the clamp assembly.

3. The modular clamp as described in claim 1, wherein the removable stud is located an offset distance from the second mounting interface towards the distal end of the bottom surface.

4. The modular clamp as described in claim 1, wherein the actuation component is one or more of a lever arm, ergonomic handle, or sliding pin handle to control a position of the spindle relative to the aperture of the slidable arm when actuated.

5. The modular clamp as described in claim 1, wherein the guide bar includes a configuration of grooves extending from the distal end of the guide bar to the proximal end of the guide bar, and wherein the slidable mounting component includes an aperture shaped to conform to the configuration of grooves such that the slidable arm is movable along an axis of the guide bar.

6. The modular clamp as described in claim 1, wherein the second mounting interface includes one or more of an O-ring, coil spring, magnetic insert, or circumferential groove attachable to the first mounting interface.

7. The modular clamp as described in claim 1, wherein the removable stud is cylindrical and is a same diameter as an aperture included on a surface.

8. The modular clamp as described in claim 1, wherein the spindle includes a threaded rod and the aperture of the slidable arm is tapped to movably position the threaded rod within the aperture.

9. The modular clamp as described in claim 1, wherein the locking spring pin is actuatable to remove the removable base member from the clamp assembly.

10. The modular clamp as described in claim 1, wherein the removable base member includes a side surface between and perpendicular to the top surface and the bottom surface, the side surface including at least two faces that form a right angle.

11. A modular clamp comprising:

a clamp assembly including:

a guide bar with a proximal end and a distal end;

a slidable arm including a proximal end and a distal end, the proximal end of the slidable arm including a slidable mounting component to adjustably connect the slidable arm as perpendicular to the guide bar, the distal end of the slidable arm connected to a clamp component that includes a first jaw located in a first transverse plane; and a base adapter including a proximal end and a distal end, the distal end of the base adapter including an aperture attachable to the proximal end of the guide bar, the proximal end of the base adapter including a first mounting interface that includes a cylindrical protrusion with a circumferential groove and one or more perpendicular apertures positioned within the circumferential groove; and a removable base member including a top surface, a bottom surface, a proximal end and a distal end, the top surface at the distal end of the removable base member including a second jaw located in a second transverse plane parallel to the first transverse plane, the top surface at the proximal end of the removable base member including a second mounting interface attachable to the first mounting interface of the base adapter that includes an aperture dimensioned to coincide with the cylindrical protrusion of the first mounting interface and fitted with a locking spring pin dimensioned to coincide with the circumferential groove of the first mounting interface to enable continuous rotation of the clamp assembly about a first vertical axis while restricting movement of the clamp assembly along the first vertical axis, the locking spring pin further dimensioned to engage with the one or more perpendicular apertures to affix the removable base member to the clamp assembly at one or more rotational orientations, the bottom surface including a removable stud located an offset distance from the first vertical axis such that the modular clamp is further rotatable about a second vertical axis.

12. The modular clamp as described in claim 11, wherein the distal end of the slidable arm includes an aperture, and wherein the clamp component includes a spindle including a proximal end and a distal end, the spindle movably positioned within the aperture, the proximal end of the spindle including the first jaw and the distal end of the spindle attached to an actuation component.

13. The modular clamp as described in claim 11, wherein the cylindrical protrusion of the first mounting interface is extendible through the removable base member.

* * * * *